US011232340B1

(12) United States Patent
Diorio et al.

(10) Patent No.: US 11,232,340 B1
(45) Date of Patent: *Jan. 25, 2022

(54) DIGITAL IDENTITIES FOR PHYSICAL ITEMS

(71) Applicant: Impinj, Inc., Seattle, WA (US)

(72) Inventors: Christopher J. Diorio, Shoreline, WA (US); Matthew Robshaw, Seattle, WA (US); Tan Mau Wu, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/912,822

(22) Filed: Jun. 26, 2020

Related U.S. Application Data

(63) Continuation of application No. 16/137,568, filed on Sep. 21, 2018, now Pat. No. 10,699,178.

(60) Provisional application No. 62/561,659, filed on Sep. 21, 2017.

(51) Int. Cl.
*G06K 19/073* (2006.01)
*G06K 7/10* (2006.01)
*G06K 19/077* (2006.01)

(52) U.S. Cl.
CPC ... *G06K 19/07309* (2013.01); *G06K 7/10257* (2013.01); *G06K 19/07758* (2013.01)

(58) Field of Classification Search
CPC .......... G06K 19/073; G06K 19/07309; G06K 19/07318; G06K 7/10257; G06K 19/07758; H04L 9/3271; H04L 9/3273; H04L 9/3297; H04L 2209/805; G06F 12/14; G06F 12/1408; G06F 12/1458; G06F 12/14914; G06F 21/62; G06F 16/381; G06F 2221/2103; G06F 2221/178; G06F 21/30; G06F 21/305; G06F 21/31; G06F 21/313
USPC .................................................. 340/5.8, 10.1
See application file for complete search history.

(56) References Cited

U.S. PATENT DOCUMENTS

| 6,317,028 | B1 | 11/2001 | Valiulis |
| 6,842,106 | B2 | 1/2005 | Hughes et al. |
| 7,031,946 | B1 | 4/2006 | Tamai et al. |
| 8,344,853 | B1 | 1/2013 | Warner et al. |
| 10,699,178 | B1 * | 6/2020 | Diorio ................ G06K 7/10257 |
| 2004/0066278 | A1 * | 4/2004 | Hughes ................. G07F 7/1008 340/10.1 |
| 2004/0222878 | A1 * | 11/2004 | Juels ..................... H04L 9/3273 340/10.1 |
| 2004/0263319 | A1 | 12/2004 | Huomo |

(Continued)

OTHER PUBLICATIONS

Non-Final Office Action for U.S. Appl. No. 16/137,568 dated Sep. 17, 2019, pp. 22.

(Continued)

*Primary Examiner* — Edwin C Holloway, III
(74) *Attorney, Agent, or Firm* — Hertzberg, Turk & Associates, LLC

(57) ABSTRACT

RFID technology may be used to provide digital identities for physical items. An RFID IC attached to or integrated into a physical item contains an identifier for the physical item. Digital identity information associated with the item, such as ownership information, history, properties, and the like, may be located on one or more networks. An entity, after authenticating itself and/or the item, may use the identifier to locate, retrieve, and/or update the item's digital identity information on the network.

20 Claims, 8 Drawing Sheets

(56) References Cited

U.S. PATENT DOCUMENTS

| | | | |
|---|---|---|---|
| 2005/0038736 A1* | 2/2005 | Saunders | G06Q 20/3821 |
| | | | 705/39 |
| 2008/0157928 A1* | 7/2008 | Butler | G06K 19/0724 |
| | | | 340/10.1 |
| 2010/0329464 A1 | 12/2010 | Kerschbaum | |
| 2011/0248852 A1 | 10/2011 | Faik et al. | |
| 2015/0134552 A1* | 5/2015 | Engels | H04L 9/3297 |
| | | | 705/318 |
| 2016/0034728 A1 | 2/2016 | Oliver et al. | |
| 2017/0345019 A1 | 11/2017 | Radocchia et al. | |

OTHER PUBLICATIONS

Notice of Allowance for U.S. Appl. No. 16/137,568 dated Feb. 25, 2020, pp. 11.

\* cited by examiner

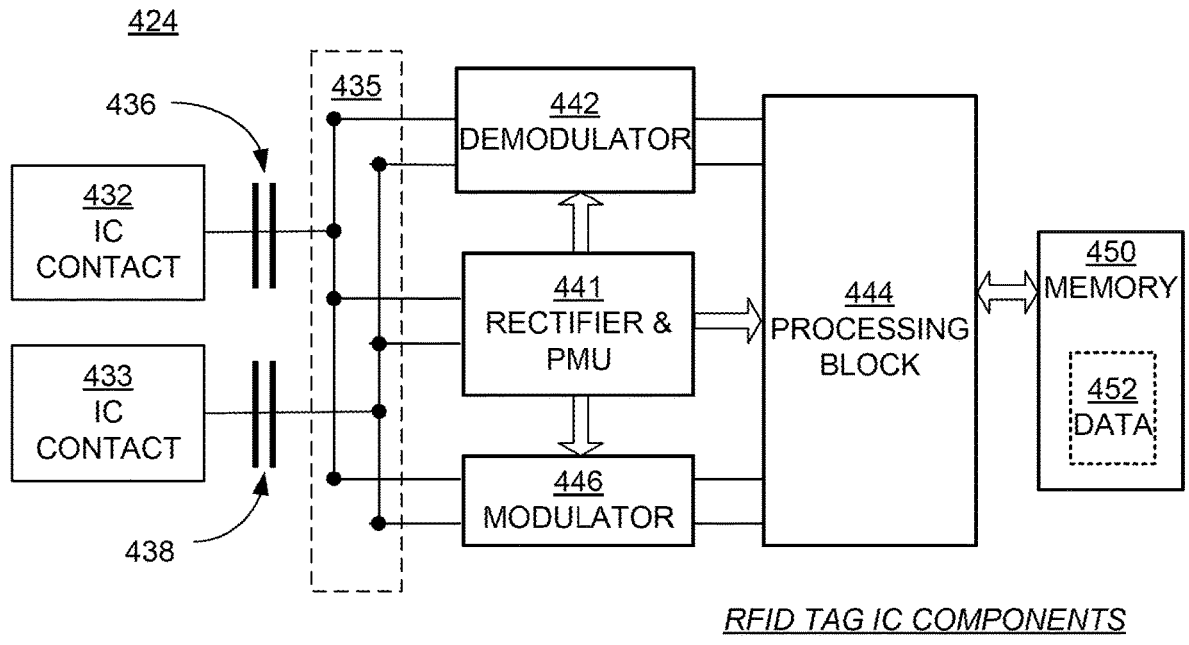
FIG. 4
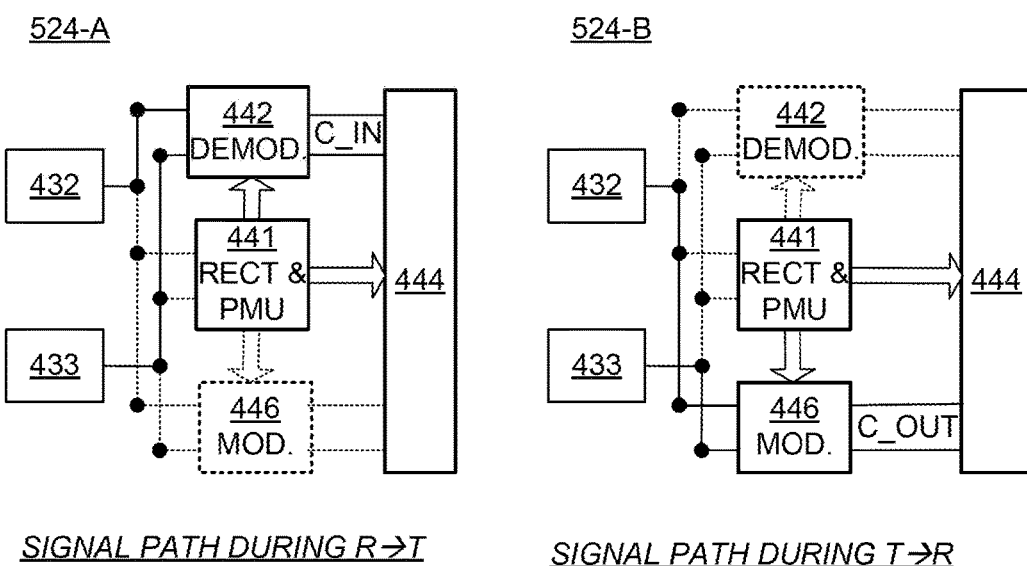
*SIGNAL PATH DURING R→T*
*SIGNAL PATH DURING T→R*
FIG. 5A
FIG. 5B

DIGITAL IDENTITIES FOR PHYSICAL ITEMS

CROSS REFERENCE TO RELATED APPLICATIONS

This application is a continuation of U.S. application Ser. No. 16/137,568 filed on Sep. 21, 2018, which in turn claims the benefit of U.S. Provisional Patent Application Ser. No. 62/561,659 filed on Sep. 21, 2017. The disclosures of the above application are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number associated with and/or identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an RFID integrated circuit (IC) coupled to one or more antennas. The RFID IC can include a radio section, a power-management section, and frequently a logical section, a memory, or both. In some RFID tags the power-management section includes an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags.

Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

The "Internet-of-Things" commonly refers to electrically-powered devices that can be connected to a network. Such devices include vehicles, home appliances, and other devices powered by electricity but not primarily designed for connection to a network. However, there exists a multitude of other "things" that are not as easily connected to a network. Such "things" include any item or object that does not include an electrical power source. Accordingly, the commonly-understood "Internet-of-Things" does not actually include the majority of "things" people interact with on an everyday basis.

Such "things," however, can be connected to a network using passive RFID technology. Passive RFID ICs and tags harvest power from the environment, and accordingly can be powered even if attached to or associated with items without electrical power sources. These RFID ICs and tags can then be configured to connect to a network, thereby providing otherwise-unpowered items with a network presence.

Embodiments are directed to providing digital identities for physical items using RFID technology. An RFID IC attached to or integrated into a physical item contains an identifier for the physical item. Digital identity information associated with the item, such as ownership information, history, properties, and the like, may be located on one or more networks. An entity, after authenticating itself and/or the item, may use the identifier to locate, retrieve, and/or update the item's digital identity information on the network.

According to one example, a method for a network to determine whether a requester has access to an item and to control, based on the determined access, item information the network provides to the requester, is provided. The item may include an RFID IC containing an item identifier and a secret. The method may include receiving a request for the item information from the requester, where the request includes the item identifier. The method may further include sending a challenge to the requester and receiving a response. If the response does not include a reply to the challenge, then the method may include concluding that the requester does not have item access and providing a first subset of the item information. If the response includes a reply to the challenge, then the method may include determining whether the reply is correctly based on the secret. If the reply is correctly based on the secret, then the method may include concluding that the requester does have item access and providing a second subset of the item information, otherwise concluding that the request is inappropriate.

According to another example, a method for a network to determine whether a requester has access to an item and to control, based on the determined access, item information the network provides to the requester, is provided. The item may have an owner, and may include an RFID IC containing an item identifier and a secret. The method may include receiving a request for the item information from the requester, where the request includes the item identifier. The method may further include sending a challenge to the requester and receiving a response. If the response does not include a reply to the challenge, then the method may include concluding that the requester does not have item access and providing a first subset of the item information. If the response includes a reply to the challenge, then the method may include determining whether the reply is correctly based on the secret. If the reply is correctly based on the secret, then the method may include concluding that the requester does have item access and providing a second subset of the item information, otherwise concluding that the request is inappropriate. The method may further include alerting the owner to the request.

According to a further example, a method for a network to determine whether a requester has access to an item and to control, based on the determined access, item information the network provides to the requester, is provided. The item may have an owner, and may include an RFID IC containing an item identifier and a secret. The method may include receiving a request for the item information from the requester, where the request includes the item identifier. The method may include receiving authorization from the owner to provide the item information. The method may further include sending a challenge to the requester and receiving a response. If the response does not include a reply to the challenge, then the method may include concluding that the requester does not have item access and providing a first subset of the item information. If the response includes a reply to the challenge, then the method may include determining whether the reply is correctly based on the secret. If the reply is correctly based on the secret, then the method may include concluding that the requester does have item access and providing a second subset of the item information, otherwise concluding that the request is inappropriate. The method may further include alerting the owner to the request.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies as will be known to those skilled in the art. Some portions of memory may be writeable and some not. "Command" refers to a reader request for one or more tags to perform one or more actions, and includes one or more tag instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

Figure 1:
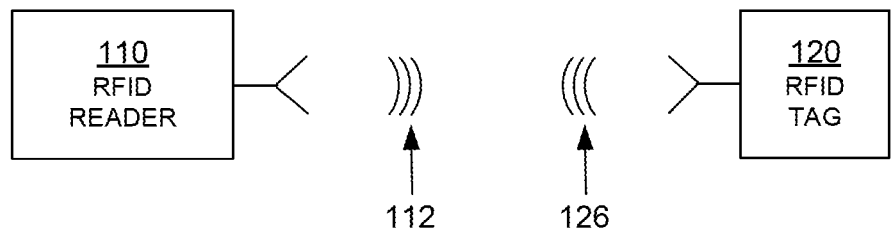
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generates signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
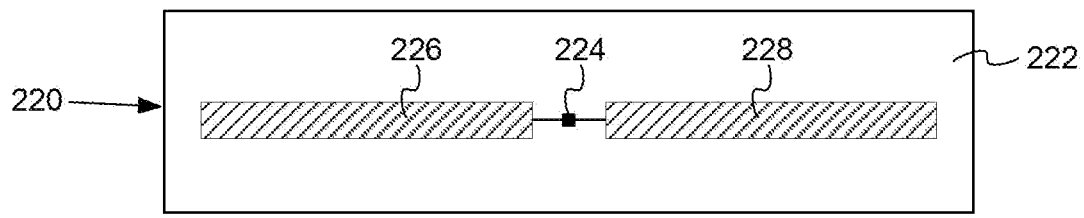
FIG. 2 is a diagram showing components of a passive RFID tag, such as a tag that can be used in the system of FIG. 1.
Figure 2:
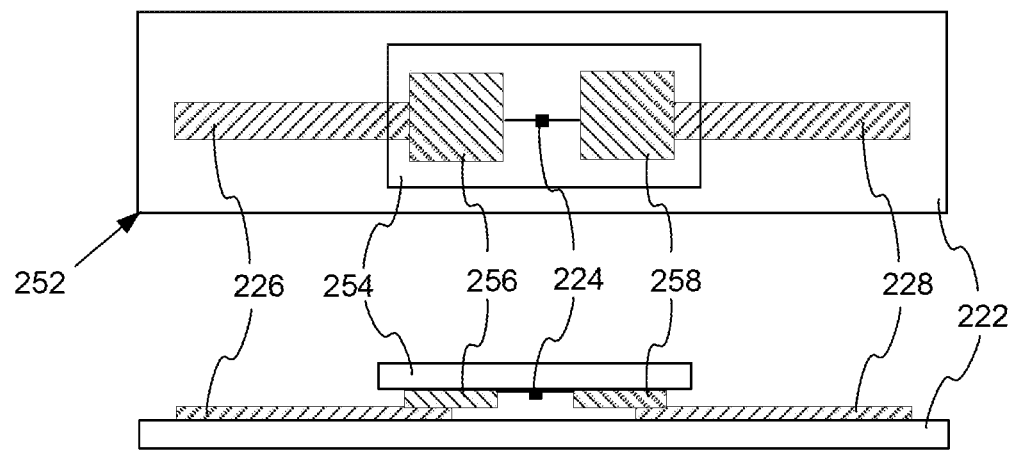
Figure 2:
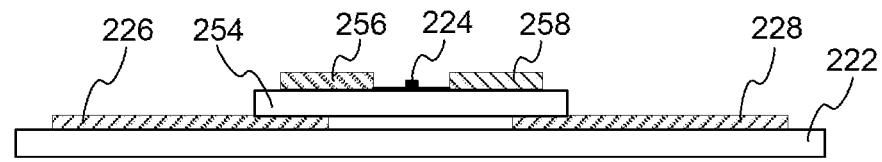

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which may both harvest power and respond if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by transmitting response signal 126.

In the embodiments of FIG. 2, antenna segments 226 and 228 are separate from IC 224. In other embodiments, the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

An RFID tag such as tag 220 is often attached to or associated with an individual item or the item packaging. An RFID tag may be fabricated and then attached to the item or packaging, or may be partly fabricated before attachment to the item or packaging and then completely fabricated upon attachment to the item or packaging. In some embodiments, the manufacturing process of the item or packaging may include the fabrication of an RFID tag. In these embodiments, the resulting RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. An "RFID IC" may refer to an item capable of receiving and responding to RFID signals. For example, an item having a separate but attached RFID tag can be considered an RFID IC, as is an item having an integrated RFID tag or an item manufactured to have the capabilities of an RFID tag. A standalone RFID tag may also be referred to as an "RFID IC".

The components of the RFID system of FIG. 1 may communicate with each other in any number of modes. One such mode is called full duplex, where both reader 110 and tag 120 can transmit at the same time. In some embodiments, RFID system 100 may be capable of full duplex communication if tag 120 is configured to transmit signals as described above. Another such mode, suitable for passive tags, is called half-duplex, and is described below.

Figure 3:
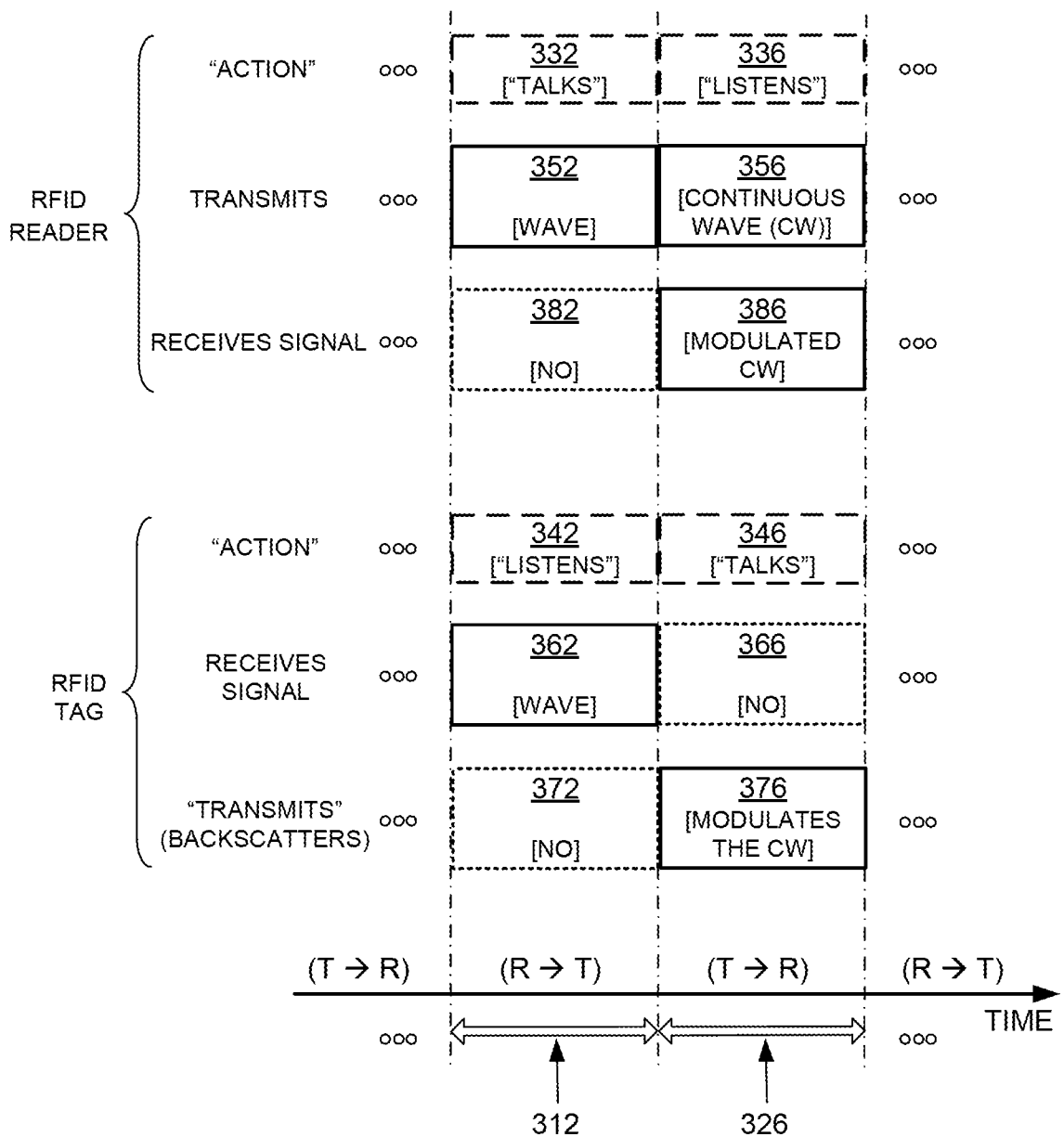
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Interval 312 may typically be of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312) and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, which may also be referred to as a backscatter time interval or backscatter interval, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126, for example by adjusting its antenna reflectance. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art, and may include one or more components configured to convert an alternating-current (AC) or time-varying signal into a direct-current (DC) or substantially time-invariant signal.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a nonvolatile memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
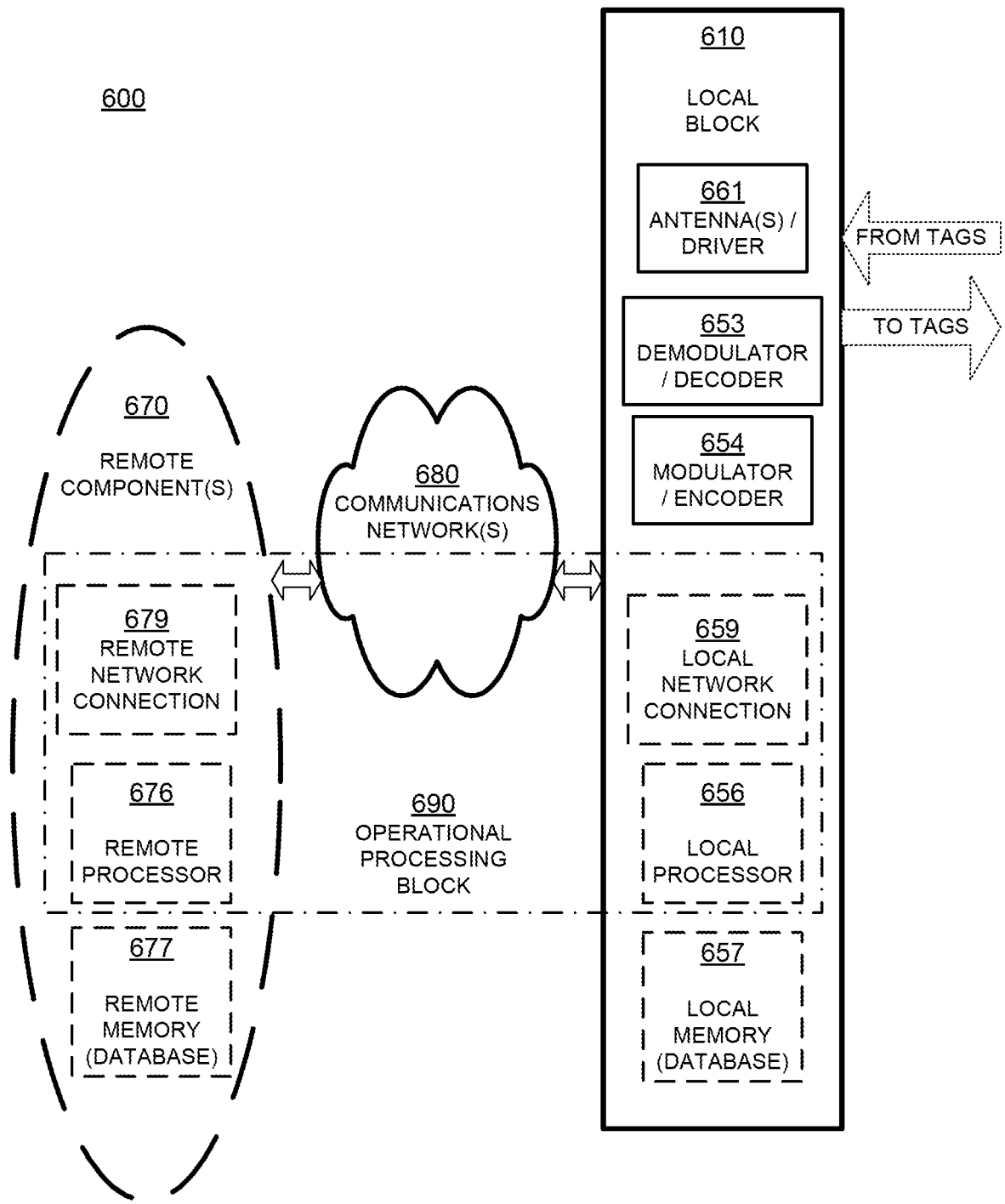
FIG. 6 is a block diagram showing a detail of an RFID reader system, such as the one shown in FIG. 1.

FIG. 6 is a block diagram of an RFID reader system 600 according to embodiments. RFID reader system 600 includes a local block 610, and optionally remote components 670. Local block 610 and remote components 670 can be implemented in any number of ways. For example, local block 610 or portions of local block 610 may be implemented as a standalone device or as a component in another device. In some embodiments, local block 610 or portions of local block 610 may be implemented as a mobile device, such as a handheld RFID reader, or as a component in a mobile device, such as a laptop, tablet, smartphone, wearable device, or any other suitable mobile device. It will be recognized that RFID reader 110 of FIG. 1 is the same as local block 610, if remote components 670 are not provided. Alternately, RFID reader 110 can be implemented instead by RFID reader system 600, of which only the local block 610 is shown in FIG. 1.

In some embodiments, one or more of the blocks or components of reader system 600 may be implemented as integrated circuits. For example, local block 610, one or more of the components of local block 610, and/or one or more of the remote component 670 may be implemented as integrated circuits using CMOS technology, BJT technology, MESFET technology, and/or any other suitable implementation technology.

Local block 610 is responsible for communicating with RFID tags. Local block 610 includes a block 651 of an antenna and a driver of the antenna for communicating with the tags. Some readers, like that shown in local block 610, contain a single antenna and driver. Some readers contain multiple antennas and drivers and a method to switch signals among them, including sometimes using different antennas for transmitting and for receiving. Some readers contain multiple antennas and drivers that can operate simultaneously. In some embodiments, block 651 may be a phased-array antenna or synthesized-beam antenna (SBA), and local block 610 may be implemented in a synthesized-beam reader (SBR) configured to generate one or more beams via the SBA. A demodulator/decoder block 653 demodulates and decodes backscattered waves received from the tags via antenna/driver block 651. Modulator/encoder block 654 encodes and modulates an RF wave that is to be transmitted to the tags via antenna/driver block 651.

Local block 610 additionally includes an optional local processor 656. Local processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 653, the encoding function in block 654, or both, may be performed instead by local processor 656. In some cases, local processor 656 may implement an encryption or authentication function; in some cases, one or more of these functions can be distributed among other blocks such as encoding block 654, or may be entirely incorporated in another block.

Local block 610 additionally includes an optional local memory 657. Local memory 657 may be implemented in any number of ways known in the art, including, by way of example and not of limitation, any of the memory types described above as well as any combination thereof. Local memory 657 can be implemented separately from local processor 656, or in an IC with local processor 656, with or without other components. Local memory 657, if provided, can store programs for local processor 656 to run, if needed.

In some embodiments, local memory 657 stores data read from tags, or data to be written to tags, such as EPCs, TIDs, other identifiers, and other data. Local memory 657 can also include reference data that is to be compared to EPCs, instructions and/or rules for how to encode commands for the tags, modes for controlling antenna 651, encryption/authentication algorithms, algorithms for tracking tag location or movement, secret keys, key pairs, individual public and/or private keys, electronic signatures, and so on. In some of these embodiments, local memory 657 is provided as a database.

Some components of local block 610 typically treat the data as analog, such as the antenna/driver block 651. Other components such as local memory 657 typically treat the data as digital. At some point, there is a conversion between analog and digital. Based on where this conversion occurs, a reader may be characterized as "analog" or "digital", but most readers contain a mix of analog and digital functionality.

If remote components 670 are provided, they are coupled to local block 610 via an electronic communications network 680. Network 680 can be a Local Area Network (LAN), a Metropolitan Area Network (MAN), a Wide Area Network (WAN), a network of networks such as the internet, or a local communication link, such as a USB, PCI, and so on. Local block 610 may include a local network connection 659 for communicating with communications network 680 or may couple to a separate device or component configured to communicate with communications network 680. Communications on the network can be secure, such as if they are encrypted or physically protected, or insecure if they are not encrypted or otherwise protected.

There can be one or more remote component(s) 670. If more than one, they can be located at the same location, or in different locations. They may communicate with each other and local block 610 via communications network 680, or via other similar networks, and so on. Accordingly, remote component(s) 670 can use respective remote network connections. Only one such remote network connection 679 is shown, which is similar to local network connection 659, etc. In some embodiments, a single one of the remote component(s) 670 may be configured to communicate with and/or control multiple local blocks, each similar to local block 610.

Remote component(s) 670 can also include a remote processor 676. Remote processor 676 can be made in any way known in the art, such as was described with reference to local processor 656. Remote processor 676 may also implement an encryption/authentication function and/or a tag location/tracking function, similar to local processor 656.

Remote component(s) 670 can also include a remote memory 677. Remote memory 677 can be made in any way known in the art, such as was described with reference to local memory 657. Remote memory 677 may include a local database, and a different database of a standards organization, such as one that can reference EPCs. Remote memory 677 may also contain information associated with commands, tag profiles, keys, or the like, similar to local memory 657.

One or more of the above-described elements may be combined and designated as operational processing block 690. Operational processing block 690 includes those components that are provided of the following: local processor 656, remote processor 676, local network connection 659, remote network connection 679, and by extension an applicable portion of communications network 680 that links remote network connection 679 with local network connection 659. The portion can be dynamically changeable, etc. In addition, operational processing block 690 can receive and decode RF waves received via antenna/driver 651, and cause antenna/driver 651 to transmit RF waves according to what it has processed.

Operational processing block 690 includes either local processor 656, or remote processor 676, or both. If both are provided, remote processor 676 can be made such that it operates in a way complementary with that of local processor 656. In fact, the two can cooperate. It will be appreciated that operational processing block 690, as defined this way, is in communication with both local memory 657 and remote memory 677, if both are present.

Accordingly, operational processing block 690 is location independent, in that its functions can be implemented either by local processor 656, or by remote processor 676, or by a combination of both. Some of these functions are preferably implemented by local processor 656, and some by remote processor 676. Operational processing block 690 accesses local memory 657, or remote memory 677, or both for storing and/or retrieving data.

RFID reader system 600 operates by operational processing block 690 generating communications for RFID tags. These communications are ultimately transmitted by antenna/driver block 651, with modulator/encoder block 654 encoding and modulating the information on an RF wave. Then data is received from the tags via antenna/driver block 651, demodulated and decoded by demodulator/decoder block 653, and processed by operational processing block 690.

Embodiments of an RFID reader system can be implemented as hardware, software, firmware, or any combination. Such a system may be subdivided into components or modules. Some of these components or modules can be implemented as hardware, some as software, some as firmware, and some as a combination. An example of such a subdivision is now described, together with the RFID tag as an additional module.

Figure 7:
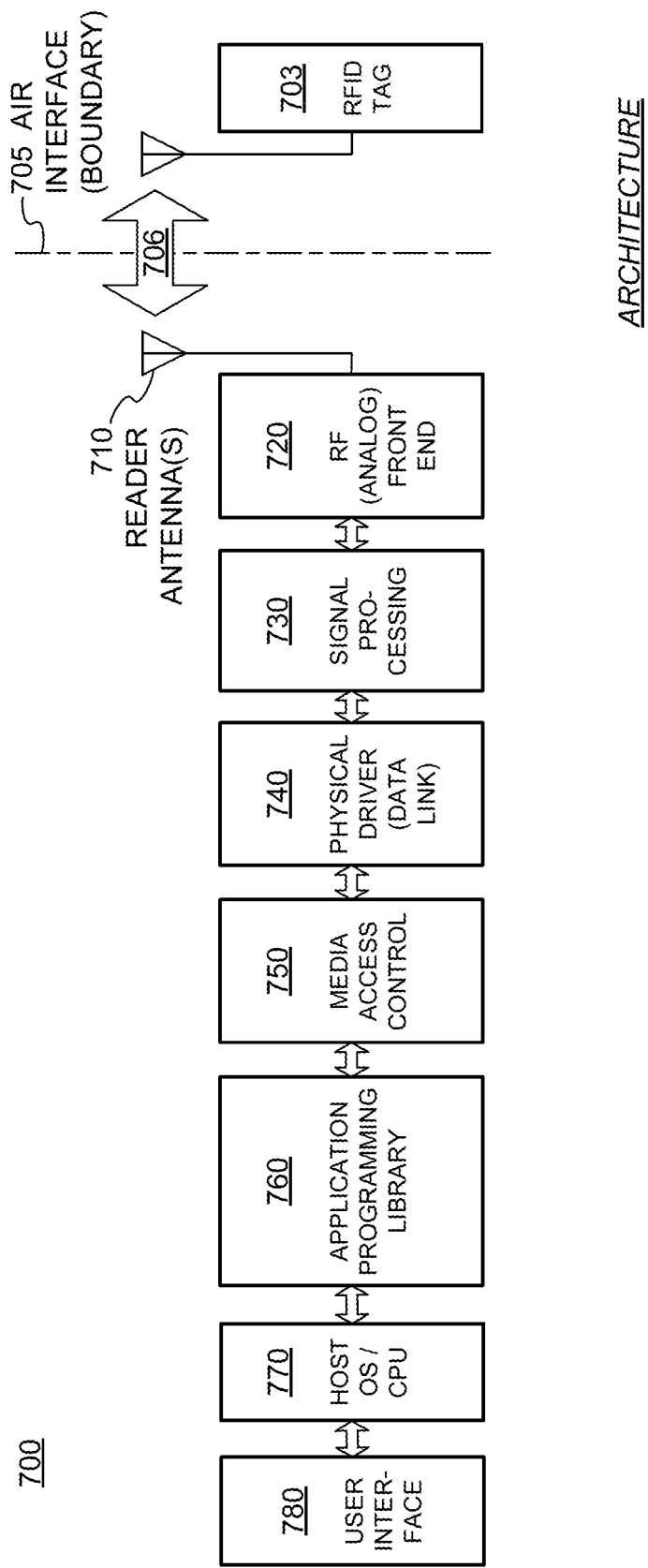
FIG. 7 is a block diagram illustrating an overall architecture of an RFID system according to embodiments.

FIG. 7 is a block diagram illustrating an overall architecture of an RFID system 700 according to embodiments. RFID system 700 may be subdivided into modules or components, each of which may be implemented by itself or in combination with others. In addition, some of them may be present more than once. Other embodiments may be equivalently subdivided into different modules. Some aspects of FIG. 7 are parallel with systems, modules, and components described previously.

An RFID tag 703 is considered here as a module by itself. RFID tag 703 conducts a wireless communication 706 with the remainder, via the air interface 705. Air interface 705 is really a boundary, in that signals or data that pass through it are not intended to be transformed from one thing to another. Specifications as to how readers and tags are to communicate with each other, for example the Gen2 Specification, also properly characterize that boundary as an interface.

RFID system 700 includes one or more reader antennas 710, and an RF front-end module 720 for interfacing with reader antenna(s) 710. These can be made as described above.

RFID system 700 also includes a signal-processing module 730. In one embodiment, signal-processing module 730 exchanges waveforms with RF front-end module 720, such as I and Q waveform pairs.

RFID system 700 further includes a physical-driver module 740, which is also known as a data-link module. In some embodiments, physical-driver module 740 exchanges bits with signal-processing module 730. Physical-driver module 740 can be the stage associated with the framing of data.

RFID system 700 additionally includes a media access control module 750. In one embodiment, media access control layer module 750 exchanges packets of bits with physical driver module 740. Media access control layer module 750 can make decisions for sharing the medium of wireless communication, which in this case is the air interface.

RFID system 700 moreover includes an application-programming library-module 760. This module 760 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 770. In some embodiments, the processor is not considered as a separate module, but one that includes some of the above-mentioned modules of RFID system 700. In some embodiments, the one or more processors may perform operations associated with retrieving data that may include a tag public key, an electronic signature, a tag identifier, an item identifier, and/or a signing-authority public key. In some embodiments, the one or more processors may verify an electronic signature, create a tag challenge, and/or verify a tag response.

User interface module 780 may be coupled to application-programming-library module 760, for accessing the APIs. User interface module 780 can be manual, automatic, or both. It can be supported by the host OS/CPU module 770 mentioned above, or by a separate processor, etc.

It will be observed that the modules of RFID system 700 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 710 receives wireless waves, which are in turn processed successively by the various modules in the chain. Processing can terminate in any one of the modules. In transmitting mode, waveform initiation can be in any one of the modules. Ultimately, signals are routed to reader antenna(s) 710 to be transmitted as wireless waves.

The architecture of RFID system 700 is presented for purposes of explanation, and not of limitation. Its particular, subdivision into modules need not be followed for creating embodiments. Furthermore, the features of the present disclosure can be performed either within one of the modules, or by a combination of them. In some embodiments RFID system 700 can be incorporated into another electronic device such as a checkout terminal in a store or a consumer device such as a mobile phone.

Physical items may have digital identities. An item's digital identity can be defined as the set of information associated with the item and accessible by authorized entities. Such information may include ownership information, history information, item property information, authentication information, authorization or privacy information, and any other suitable information related to or associated with the item.

Figure 8:
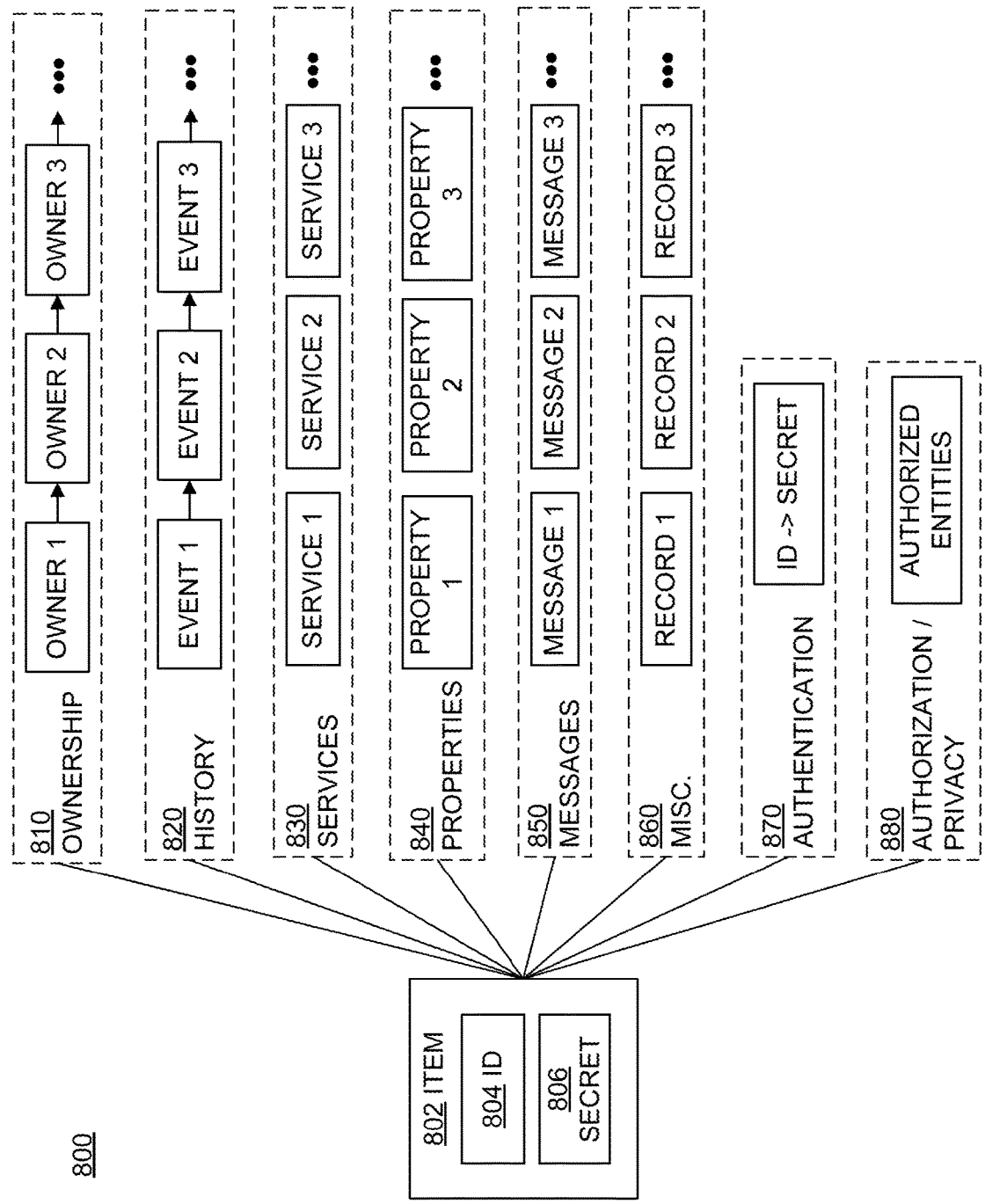
FIG. 8 depicts how an item's digital identity can be represented, according to embodiments.

FIG. 8 depicts how an item's digital identity can be represented, according to embodiments. Diagram 800 depicts an item 802 that has an associated ID 804 and secret 806. Item 802, if electronic in nature, may itself store ID 804 and secret 806. In other embodiments, item 802 may have an associated or attached device (for example, an RFID IC or tag) that stores ID 804 and secret 806. ID 804 may identify item 802, and may be provided to any requesting entity or only to an authorized requesting entity. Secret 806 is associated with ID 804 and therefore item 802, and is generally not provided to any requesting entity. Secret 806 can be used to authenticate that a message purporting to be from item 802 is actually from item 802, or that another entity knows secret 806 and therefore is authorized to request or access information about item 802. Secret 806 may be a secret key, a private key of a private-public key pair, a password, or any other information not generally known to the public. In some embodiments, secret 806 may include multiple secrets, each of which may be used differently or have different characteristics.

Item 802 has a digital identity that is represented by ownership information 810, history information 820, services information 830, properties information 840, messages information 850, other information 860, authentication information 870, authorization/privacy information 880, and any other suitable information related to or associated with item 802. Ownership information 810 identifies one or more past or present owners of item 802. An item's owner (or owners) is an entity that legally owns or has title to at least part of the item. Ownership information 810 may identify an owner using an owner identification code, a public key corresponding to a private key known to the owner, or any other means to identify an entity. In some embodiments, ownership information 810 may include information about transfers of ownership. For example, ownership information 810 may include sale information, contract information, agreements, or any other suitable information about the transfer of ownership of item 802 between two or more parties or entities.

In some embodiments, ownership information 810 may include information about past or present possessors of item 802. An item's possessor is the entity (or entities) that currently possesses or has custody of the item. An item's owner may or may not be the same as an item's possessor. For example, an item's owner may rent, lease, or otherwise provide the item to a possessor. In these embodiments, ownership information 810 may also include information about transfers of possession, similar to the ownership transfer information mentioned above.

History information 820 identifies one or more past or current events associated with item 802. For example, history information 820 may include changes of ownership, changes in possession, transactions involving item 802, previous locations of item 802, changes in the location of item 802, previous instances in which information was requested or updated regarding item 802, previous instances of damage to item 802, or any other suitable historical information. Each of the events in history information 820 may be associated with information related to the time or location at which the event took place. For example, information about an event in history information 820 may include a timestamp or a location identifier. A "location" as used herein may be defined with respect to an administratively-defined zone (e.g., a certain area of a warehouse, or the warehouse itself), a geographic area (e.g., a certain nation-state or political entity), or an arbitrary set of coordinate axes (e.g., three feet west of the entrance to a facility)

Services information 830 identifies one or more services associated with item 802 that are available. In this disclosure, a "service" available for an item refers to a feature or capability associated with or available for the item and performed by one or more external entities. These external entities may also be referred-to as "services", as in FIG. 10, below, and may be implemented as one or more network servers, hosts, devices, or any other hardware capable of performing services associated with the item. Services may apply to the item itself or to information associated with the item. Examples of the former include warranty information, repair or replacement services, available upgrades or updates, and similar. Examples of the latter include storage and/or access of item-related data, location tracking for the item, item security services (e.g., authentication of the item), item privacy services (e.g., who is allowed access to what information about the item), and similar.

Properties information 840 identifies one or more properties associated with item 802. For example, properties information 840 may include information about physical characteristics of the item, such as make and model, type, size, weight, color, shape, composition, or any other suitable property. Properties information 840 may also include information about nonphysical characteristics of the item, such as manufacturer information, country of origin, labor and/or farming practices used during manufacture, seller or distributor information, region of sale, cost or price, whether it is hazardous, customer satisfaction or reviews, IP licensures, approvals or certifications by organizations (e.g., NGOs, governments, laboratories, certifying entities, etc.), or similar. Properties information 840 may further include information about item usage, such as energy usage, safety notices, warnings, warranties, care instructions, operating instructions, available accessories, recall information, repair or maintenance information, available services for the item, and similar.

Messages information 850 identifies one or more messages intended for the item, an owner of the item, and/or a possessor of the item. Such messages may include recall notices, updates regarding item location and locations where the item was detected, updates regarding item transitions between different zones (administrative, geographical, locational, and/or system-defined) notifications of issues relating to the item, notifications of item information requests from one or more entities, notifications of item digital identity updates or changes, advertisements for similar or related items, or any other suitable messages related to the item and having content meant to be distributed. Messages in messages information 850 may be pushed to (sent to without a preceding request) and/or pulled by (sent only when requested by) appropriate entities. In some embodiments, a message's parameters indicate whether it is to be pushed to or pulled by appropriate entities.

Miscellaneous information 860 may identify any other information associated with item 802. For example, miscellaneous information 860 may include information about news articles mentioning item 802, information about items similar to item 802, information about processes that use or implicate item 802, or any other information about item 802 that is not categorized as ownership, history, properties, authentication, or authorization/privacy information.

Authentication information 870 identifies how an item claiming to be item 802 can be authenticated. For example, authentication information 870 may store and link together ID 804 and secret 806. Authentication information 870 may not be generally publicly available in that a requester cannot request and receive ID and secret information. However, authentication information may be accessible to certain authorized entities, such as an authentication authority, and can be used by the authorized entities to confirm or refute whether an item claiming to be item 802 actually is item 802, or whether an entity claiming to possess item 802 actually possesses item 802.

Authorization/privacy information 880 identifies the entities who are authorized to access information about item 802. For example, authorization/privacy information 880 may identify entities that are authorized to access information about item 802, as well as the particular levels of access each entity is authorized for. Authorization/privacy information 880 may be publicly available or may only be available to authorized entities. For example, authorization/privacy information 880 may be accessible to authentication services that can then use the information to determine whether an entity requesting information about item 802 is in fact authorized to access the requested information.

The various item information described above may be stored at an associated item (for example, on a device associated with or attached to the item and having storage media, such as a computing device, an RFID IC, or similar), on one or more networks (e.g., at one or more remote servers or other devices), at some other location, or a combination of the foregoing. Information of a single category (e.g., ownership information 810) may be stored as records on a single location or spread across multiple locations. In some embodiments, such information may be stored as records on one or more decentralized journals spread across multiple entities or locations. In other embodiments, information may be not stored according to the categories described herein and may be stored in any suitable organization. For example, a certain record stored at a certain entity may include some ownership information, some history information, some services information, some properties information, some messages information, some "other" information, and/or some authentication information.

Item digital identity information itself may have ownership information, history information, services information, properties information, messages information, and the like. In some embodiments, a piece of digital identity information about an item may be owned by an entity that may or may not be the item's owner or possessor. The owner of a piece of digital identity information may be the entity that creates or receives ownership of the digital identity information. For example, an item's manufacturer may create digital identity records (e.g., ownership information, history information, services information, properties information, messages information, other information, authentication information, authorization/privacy information, etc.) for the item and associate the digital identity records with the item's digital identity, and may therefore be the owner of the digital identity records it has created. As another example, an item's purchaser may create or add ownership information to the item's digital identity to reflect the purchaser's ownership of the item, and therefore may be the owner of both the item and the purchaser-created or modified ownership information. As yet another example, an entity that observes the item passing by and creates or adds history information to the item's digital identity to record the observation of the item may be the owner of the created/added history information despite not being the owner or possessor of the item.

Owners of an item or the item's digital identity information may be able to control access to the item's digital identity information. For example, an owner of a piece of item digital identity information may control viewing privileges (e.g., whether the information is publicly-available or only available to certain entities) and/or adjustment privileges (e.g., whether anyone can adjust the information or only certain entities can). In some embodiments, an owner of the item or the item's digital identity may allow another entity to grant or revoke access to the item's digital identity information.

There may be a hierarchy of ownership that determines whether item digital identity information can be accessed or adjusted. For example, an item's owner may be able to view and/or adjust digital identity information about the item that another entity has recorded, even if the other entity has restricted access to that information. In some embodiments, information may be removed from an item's digital identity by the item owner or information owner. In other embodiments, information added to an item's digital identity may be adjustable but never entirely removable. In these situations, the information may have associated history information that reflects changes, additions, and/or deletions to the history, as well as the identities of the entities performing the changes/additions/deletions.

Figure 9:
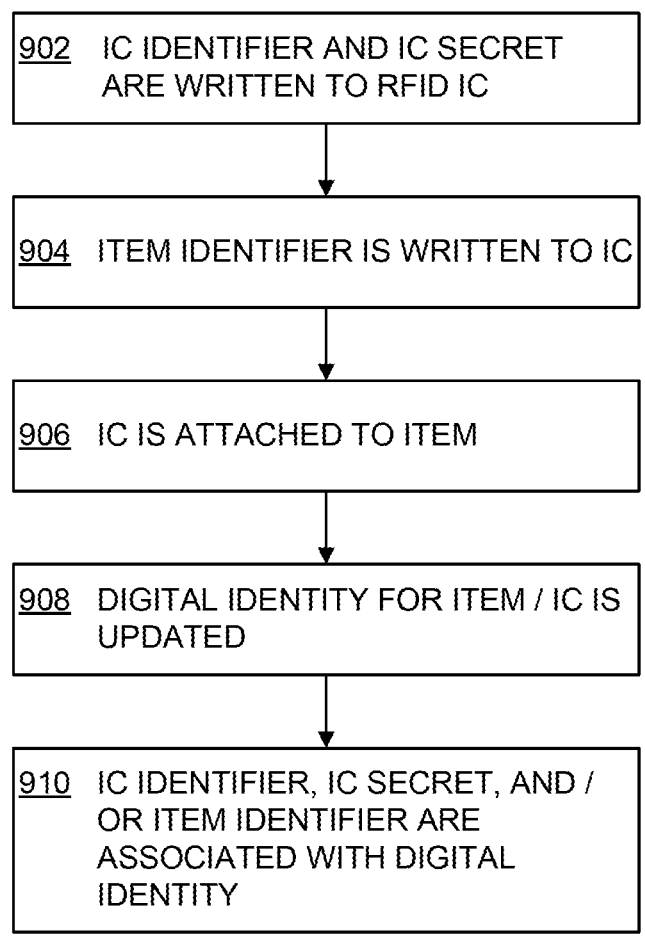
FIG. 9 depicts a process for linking an RFID IC to an item's digital identity, according to embodiments.

In some embodiments, RFID ICs are used to link physical items to digital identities. FIG. 9 depicts a process for linking an RFID IC to an item's digital identity, according to embodiments. An example process 900 for using RFID ICs to link items to digital identities may begin at step 902, where an IC identifier and an IC secret are written to or stored on an RFID IC. The IC identifier uniquely identifies (at least for a time) the particular RFID IC upon which it is written. The IC identifier may also be uniquely associated with the IC secret.

Practically speaking, uniqueness for a finite-length identifier can only be assured for a time, because at some point the number of ICs or items that have been assigned identifiers will exceed the number of potential identifiers of a given, finite-length. Accordingly, the term "unique" as used herein means uniqueness only for a time.

The IC identifier may or may not encode information about the IC itself. For example, the IC identifier may be a TID, which may encode information about the IC, such as the manufacturer of the IC. As another example, the IC identifier may be another code, string, or value that does not encode information about the IC. The IC secret is similar to secret 806 in FIG. 8 and is known only to the RFID IC and a select number of authorized entities. The IC identifier and/or IC secret may be written to or stored on the RFID IC by the IC manufacturer or by any other suitable entity.

At step 904, an identifier for an item (or "item identifier") may be written to the RFID IC. At step 906, the RFID IC is attached to or associated with the item. Steps 904 and 906 may occur in the order as depicted, in the reverse order, or at substantially the same time. In some embodiments, the item identifier may include or be derived from the IC identifier. The RFID IC or some other entity may construct the item identifier from the IC identifier and write the item identifier to IC memory. In some embodiments, especially when the item identifier includes the IC identifier, a separate item identifier may not be written to IC memory. Instead, the already-written IC identifier may be used as at least a portion of the item identifier. The item identifier may uniquely identify (at least for a time) the item to which the RFID IC is (to be) attached, for example by encoding information about the specific item or being resolvable to the item's unique digital identity.

The item identifier may or may not encode information about the item. For example, the item identifier may be an EPC, which may encode information about the item, such as the manufacturer of the item. As another example, the item identifier may be some other code or string that does not encode information about the item. The item identifier may be written to the RFID IC by any suitable entity, such as the tag manufacturer, the item manufacturer, a retailer, an RFID tag manufacturer, or similar.

The attachment of the RFID IC to the item at step 906 may also be done by any suitable entity. In one embodiment, the RFID IC is first assembled into an RFID tag. The RFID tag is then attached to the item. In other embodiments, the RFID IC may be integrated into the item during or after manufacture. For example, the item may include elements suitable for an RFID tag substrate or antenna, and the RFID IC may be coupled to those elements.

At step 908, a digital identity for the item and/or the RFID IC is updated if existing and created if not. Any suitable and authorized entity may update or create the digital identity. The digital identity may include the information described above in relation to FIG. 8, as well as other information, and may be stored at the RFID IC, at another device associated with the item, and/or at one or more network locations. An item's digital identity may be created before or after the item is created. The item and the RFID IC may share the same digital identity or have separate digital identities.

At step 910, a suitably authorized entity associates the digital identity with the IC identifier, the IC secret, and/or the item identifier. For example, the entity may associate the IC and/or item identifier to information and records in the digital identity. In some embodiment, the digital identity may be associated with the IC identifier and/or the item identifier upon creation.

In some embodiments, a single item may have or be associated with multiple RFID ICs. In these embodiments, some or all of the RFID ICs may share the same IC identifier and/or IC secret, or each RFID IC may have a different IC identifier and IC secret. Similarly, some or all of the RFID ICs may store the same item identifier, or each RFID IC may have a different item identifier. In any case, if different RFID ICs associated with the same item store different item identifiers, those different identifiers may be associated with the same item digital identity, or with different aspects of the item digital identity.

After an identifier has been associated with an item's digital identity, the identifier can be used to access or adjust information about the item and its digital identity. In some embodiments, the identifier is a pointer to another location containing digital identity information for the item. In this case, the identifier may not itself encode information about the item, and instead encodes information about where the digital identity information is located. For example, instead of including a TID or EPC, the identifier may encode a value or bit sequence that can be translated into a network address or other indication of a network location.

Any of a variety of identifier encoding schemes can be used to encode RFID identifiers that do not contain item information but can be resolved into network address information. Accordingly, an entity that retrieves an identifier from an item may not know the identifier encoding scheme and may be unable to extract location information from the identifier. In some embodiments, the entity may consult a resolving entity or authority that can determine the identifier's encoding scheme and resolve the identifier into a pointer to a network location. The pointer can then be used to access or adjust digital identity information.

Figure 10:
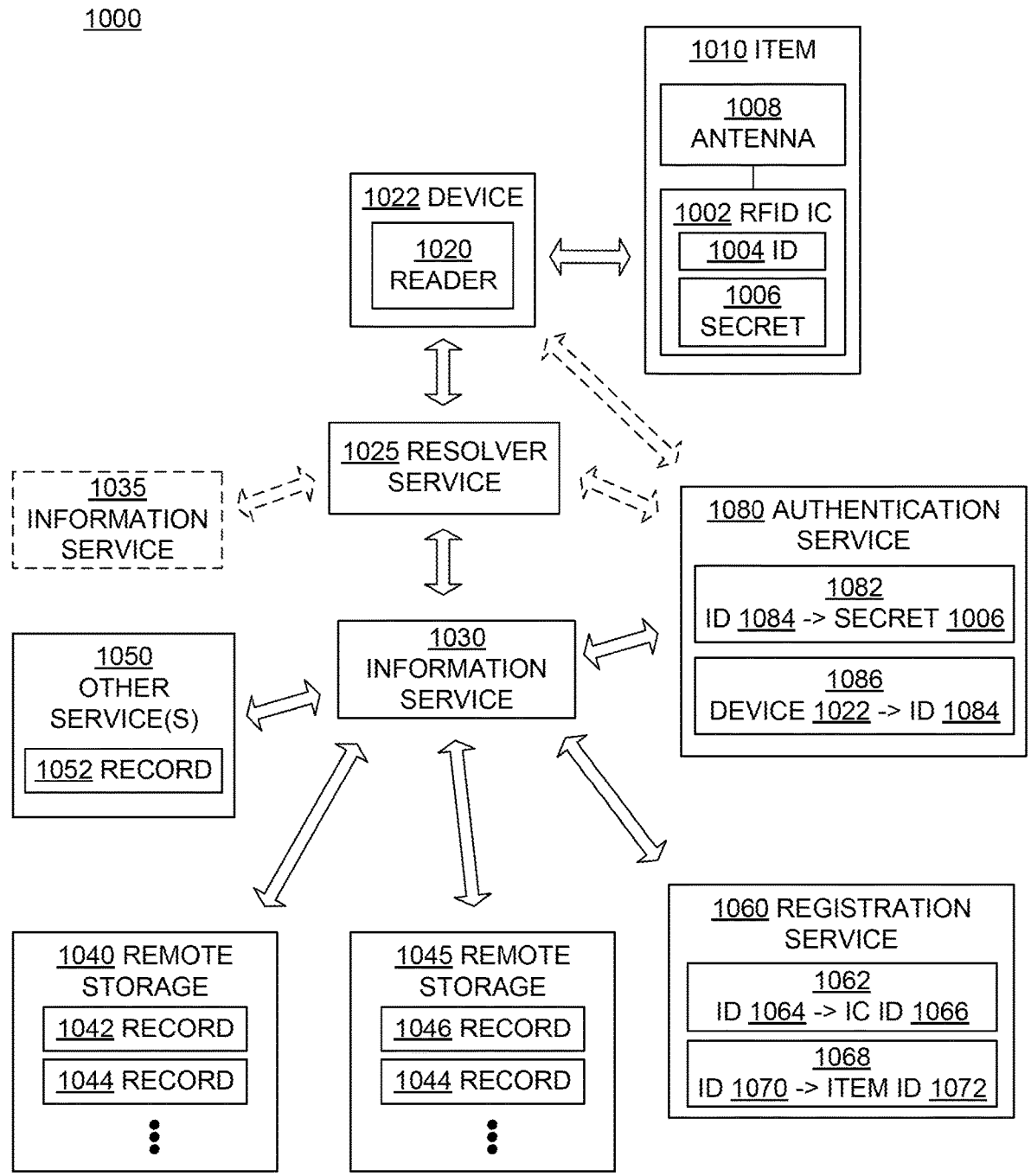
FIG. 10 depicts how an RFID identifier may be used to access digital identity information, according to embodiments.

FIG. 10 depicts how an RFID identifier may be used to access digital identity information, according to embodiments. Diagram 1000 depicts an RFID IC 1002 attached to an item 1010. RFID IC 1002 stores an ID 1004 and a secret 1006 (similar to ID 804 and secret 806), and is coupled to an antenna 1008 disposed on, within, or implemented by item 1010. IC 1002 and/or antenna 1008 may be formed as an inlay that is attached to item 1010 after item manufacture or may be integrated within item 1010 during item manufacture. In some embodiments, IC 1002 is integrated with item 1010 such that removal of IC 1002 irreversibly disables or destroys IC 1002 and/or item 1010. In some embodiments, item 1010 may have other associated ICs, as described above.

Device 1022 can communicate with IC 1002 to retrieve ID 1004 via reader 1020, which is integrated in, associated with, or otherwise communicatively coupled with device 1022. Device 1022 can be a portable computing device, such as a smartphone, a smartwatch, a personal digital assistant, a laptop computer, a tablet computer, a wearable device, or any other portable electronic device suitable for coupling to reader 1020. Regardless of its type, device 1022 is configured to communicate with one or more local or remote networks, for example via a network interface.

In some embodiments, device 1022 may be separate from reader 1020. In these embodiments, device 1022 may communicate with reader 1020 via one or more networks. For example, reader 1020 may be a fixed reader, associated with a facility, that communicates with device 1022 via a facility network or other network. Device 1022 (or a user of device 1022) may request reader 1020 to communicate with IC 1002. Reader 1020 may then communicate with IC 1002 on behalf of device 1022, assuming that reader 1020 and/or device 1022 is authorized to do so, as described below.

In some embodiments, ID 1004 includes information about item 1010 or IC 1002, for example in the form of a TID, an EPC, or any suitable identifier that does include information about item 1010 or IC 1002. In other embodiments, ID 1004, while serving as an identifier for item 1010 and/or RFID IC 1002, may not actually include any information about item 1010 or IC 1002. For example, ID 1004 may use a certain encoding scheme to encode a pointer identifying the location of one or more appropriate information services. "Encoding scheme", as used herein, refers to how data values can be represented during output. An encoding scheme may specify organization or order, coding (e.g., binary, hexadecimal, alphanumeric), compression, encryption, or any other suitable way in which data values can be reversibly represented. "Pointer", as used herein, is a data value or bit sequence that represents the location or address of one or more services or records. A pointer could include a uniform resource identifier (URI), a uniform resource name (URN), a uniform resource locator (URL), an Internet Protocol (IP) address, a media access control (MAC) address, or any other suitable means of identifying a location or address of a resource. In another embodiment, the encoding scheme of ID 1004 may itself indicate the appropriate information service(s). For example, the encoding scheme may be associated with a certain information service, and the encoded value may include information that allows the information service to locate digital identity information about the item.

Upon retrieving ID 1004 from IC 1002, device 1022 can then communicate with a resolver service 1025 to determine appropriate information service(s) from which additional information about IC 1002 and/or item 1010 can be retrieved. Resolver service 1025 is an entity located on a network accessible to device 1022 that can use ID 1004 to identify information service(s) that have access to digital identity information about item 1010. Resolver service 1025 has knowledge (or access to knowledge) of various identifier encoding schemes and can use the knowledge to determine the encoding scheme of ID 1004. For example, resolver service 1025 may attempt to extract a pointer from ID 1004 using each of the different potential schemes and test the extracted pointers for validity, where a valid pointer indicates a successful extraction. In some embodiments, ID 1004 itself may contain some information about its encoding scheme, and resolver service 1025 can determine and use the contained encoding scheme information to select an appropriate encoding scheme for extracting pointer(s) from ID 1004. Resolver service 1025 may resolve an identifier such as ID 1004 directly into a pointer or may use one or more external entities to resolve the identifier into a pointer, as described in further detail below.

ID 1004, when correctly resolved by resolver service 1025, may indicate that information service 1030, which is an entity located on a network accessible to resolver service 1025, has access to digital identity information about item 1010 and/or RFID IC 1002. In some embodiments, resolver service 1025 may resolve an identifier to multiple information services. For example, resolver service 1025 may resolve ID 1004 to at least information service 1030 and information service 1035. Further, while resolver service 1025 and information service 1030 are depicted in FIG. 10 as separate entities, in some embodiments their functions may be combined into a single service.

Upon resolving ID 1004 to information service 1030, resolver service 1025 may send ID 1004 along with a request for digital identity information to information service 1030. As described above, item digital identity information may be stored as records at one or more network locations. ID 1004 may identify such records in several ways. In one embodiment, ID 1004 may encode, using a certain encoding scheme, a pointer that identifies both a location at which records are stored (e.g., a certain database, a network directory, a hostname, etc.) and a record or set of records at the location (e.g., a database entry, a network page, a file, etc.). In another embodiment, the encoding scheme of ID 1004 may itself indicate the location, and the value encoded in ID 1004 may identify the record(s) at the indicated location. For example, the encoding scheme may be associated with a certain location, and the encoded value may include a pointer that identifies one or more records at the location.

Information service 1030 knows how ID 1004 identifies records and may use its knowledge to determine pointer(s) to digital identity records for item 1010 and/or IC 1002 at one or more locations. For example, in diagram 1000 remote storage 1040 stores, among other records, records 1042 and 1044 containing digital identity information for item 1010 and/or IC 1002. Remote storage 1045 stores, among other records, records 1046 and 1044, also containing digital identity information for item 1010 and/or IC 1002. Other service(s) 1050 may store, among other records, record 1052 containing information about services available for item 1010 and/or IC 1002. Other service(s) 1050 may also be configured to provide or authorize services for item 1010 and/or IC 1002, such as those described in relation to FIG. 8. Different remote storages and services may store similar information—for example, both remote storages 1040 and 1045 store records 1044. In this example, information service 1030 may be able to directly or indirectly resolve ID 1004 into pointers to remote storages 1040 and 1045, other service(s) 1050 and/or the specific records 1042, 1044, 1046, and 1052.

Upon a suitable request from information service 1030, remote storages 1040/1045 or other service(s) 1050 may then provide information from and/or update information in records 1042, 1044, 1046, and 1052, or any other suitable records. The information may be provided to information service 1030 and/or resolver service 1025, which may then send the information back to the requesting entity (e.g., device 1022) or to another entity if appropriate. If a service from, for example, other service(s) 1050 is requested, other service(s) 1050 may send a notification regarding the requested service back to the requesting entity or to another entity if appropriate. For example, other service(s) 1050 may send a notification indicating that the requested service is approved, disapproved, requires further authorization, or any other suitable service-related information. Remote storages 1040/1045 and other service(s) 1050 may be associated with a manufacturer (e.g., a manufacturer of IC 1002 or item 1010), a distributor (e.g., a reseller, retailer, and the like), a certifying entity, a governmental organization, an item owner, an item possessor, an item observer, or any other entity that would store or know digital identity information about or provide services regarding item 1010 and/or IC 1002. Records 1042, 1044, 1046, and 1052 likewise may include any suitable digital identity information about item 1010 and/or IC 1002, such as the digital identity information described above in relation to FIG. 8.

Remote storages 1040/1045 may be implemented in any suitable way. For example, remote storages 1040/1045 may be individual, monolithic databases; part of a distributed database; part of a distributed ledger or blockchain (especially in the context of recording transactions and changes in ownership); or any other suitable data storage medium or implementation. Other service(s) 1050 may be implemented like the other services described herein, as described above.

As mentioned above, information service 1030 can use ID 1004 to determine pointer(s) that leads to one or more records. In some cases, information service 1030 determines from ID 1004 a pointer that leads directly to remote storages (e.g., remote storages 1040 and/or 1045), other services (e.g., other service(s) 1050), or records (e.g., records 1042, 1044, 1046, and/or 1052). In other cases, information service 1030 determines from ID 1004 a pointer that leads to one or more different pointers, which in turn then lead to remote storages, services, or records.

In some embodiments, information service 1030 may use a registration service 1060 to assist in or perform the ID resolution or conversion. Registration service 1060 is an entity located on a network accessible to information service 1030 that stores or has access to information linking IDs that otherwise do not encode information about RFID ICs or items to individual RFID ICs or items, as described above in relation to FIG. 9. For example, registration service 1060 may have access to records 1062 and 1068. Record 1062 links an ID 1064 to ID 1066 for IC 1002, and record 1068 links an ID 1070 to ID 1072 for item 1010. IDs 1064 and/or 1070 may be, include, and/or be derived from ID 1004, each other, and/or any other suitable identifier. For example, IDs 1064 and 1070 may be identical to ID 1004 and/or each other. ID 1066 uniquely identifies IC 1002 and may or may not encode information about IC 1002. For example, ID 1064 may include a serial number, a product name, or any other identifier that can uniquely identify IC 1002. ID 1072 uniquely identifies item 1010 and may or may not encode information about item 1010. For example, ID 1072 may include a serial number, a product name, or any other identifier that can uniquely identify item 1010.

Upon receiving an identifier from information service 1030 or some other entity, registration service 1060 may determine, based on records such as records 1062 and 1068, whether the received identifier corresponds or links to any other identifiers. For example, registration service 1060 may receive ID 1004 from information service 1030 and determine that ID 1004 corresponds to ID 1064 and/or ID 1070. Accordingly, registration service 1060 may then provide IDs 1064 and/or 1070 to information service 1030. Information service 1030 may then use IDs 1064 and/or 1070 to access information about item 1010 and/or IC 1002, as described above.

In some embodiments, a requesting entity such as information service 1030 may only request certain linked identifiers. For example, information service 1030 may only request item identifiers associated with ID 1004. In this situation, registration service 1060 may provide item ID 1072 but not IC ID 1066.

IDs 1004, 1066, and 1072 may be unique to an IC 1002 and item 1010, and vice-versa. In another embodiment, the IDs 1066/1072 identify a class of ICs or items to which IC 1002 and item 1010 belong. For example, ID 1066 may include a TID that identifies the manufacturer, type, or other information about IC 1002, and ID 1072 may include an EPC that similarly identifies the manufacturer, type or other information about item 1010. In this embodiment, uniqueness may be provided by combining ID 1066 and/or ID 1072 with at least a portion of ID 1004 to form a combined ID that is unique to IC 1002, item 1010, or the combination of IC 1002 and item 1010. Such a combined ID may also be used even if ID 1066 and/or ID 1072 are themselves unique, to identify the unique combination of IC 1002 and item 1010.

Access to digital identity information about item 1010 and/or IC 1002 may be restricted. In these embodiments, an information provider may verify the identity of ("authenticate") an entity requesting access to digital identity information and determine whether the authenticated entity has permission (is "authorized" or has "authorization") to access the digital identity information.

In some embodiments, authorization to access digital identity information about an item may be based on whether the requesting entity possesses the item. An entity ("possessor") that "possesses" or "has possession of" an item has immediate or near-real-time access to an RFID IC associated with the item. For example, an item's possessor may physically be in close proximity to the item such that a possessor reader can communicate with the item RFID IC. As another example, an item's possessor may not physically be in close proximity to the item, but can communicate with the item RFID IC via a reader that the possessor can communicate with (for example, over a network). An information provider may verify that an entity possesses an item by authenticating the item and/or one or more RFID ICs associated with the item, as described in more detail below.

First, an entity may want to authenticate IC 1002. In one embodiment, IC 1002 may authenticate itself by at least partially cryptographically securing the ID 1004 with secret 1006 (for example, via encryption, decryption, and/or digital signature) before sending to device 1022. In another embodiment, IC 1002 may respond to a challenge sent from device 1022 with a reply cryptographically generated based on at least the challenge and secret 1006. In either case, device 1022 or another entity may then authenticate IC 1002 using the cryptographically secured ID 1004 or the cryptographically generated reply, in some embodiments with the assistance of an external or network entity such as an authentication service, described below.

IC 1002 in turn may authenticate an entity requesting access to digital identity information by authenticating the device 1022 used to retrieve ID 1004. IC 1002 may know secret information associated with authorized devices, and may determine whether device 1022 knows the secret information and therefore is both authentic and authorized. For example, IC 1002 may send device 1022 a challenge, device 1022 may send a cryptographic response to the challenge, and IC 1002 may determine whether the cryptographic response is correctly derived from the challenge and the secret information. As another example, IC 1002 may send an IC-generated random value (salt) encrypted (or decrypted) using secret 1006 to device 1022. If device 1022 responds with the correct salt value, then IC 1002 knows that device 1022 has access to secret 1006, and therefore is authentic and authorized. Other embodiments may use any other suitable techniques for IC 1002 to authenticate device 1022.

Entities storing or providing access to item digital identity information may determine whether an entity requesting access to item digital identity information is authentic and authorized for that information. Resolver service 1025, information service 1030, remote storages 1040 and 1045, other service(s) 1050, and registration service 1060 may determine whether device 1022 is authentic and authorized before providing access to digital identity information about item 1010 or IC 1002. Information service 1030 may determine whether resolver service 1025 is authentic and authorized before accessing or providing digital identity information about item 1010 or IC 1002. Remote storages 1040/ 1045, other service(s) 1050, and/or registration service 1060 may determine whether information service 1030 is authentic and authorized before providing access to digital identity information about item 1010 or IC 1002.

In some embodiments, a requesting entity may also determine whether an entity purporting to store or have access to item digital identity information is authentic. For example, device 1022 may determine whether resolver service 1025 is authentic, resolver service 1025 may determine whether information service 1030 is authentic, and information service 1030 may determine whether remote storages 1040/ 1045, other service(s) 1050, and/or registration service 1060 are authentic.

In these embodiments, the various entities may know secret information associated with authentic and authorized entities and may be able to determine whether a requesting entity is authentic and authorized, similar to how IC 1002 authenticates device 1022. In other embodiments, the various entities may use an authentication service 1080 to assist in or perform the authentication and authorization.

Authentication service 1080 (which may also be referred-to as a verification service) is an entity located on a network accessible to device 1022, resolver service 1025, information service 1030, remote storages 1040 and 1045, other service(s) 1050, and/or registration service 1060, and may be configured to authenticate an IC, an item, an IC-item combination, and/or an entity requesting digital identity information. In some embodiments, authentication service 1080 may also be configured to authenticate a service, such as resolver service 1025, information service 1030, other service(s) 1050, or registration service 1060, or a remote storage, such as remote storages 1040 and 1045. Authentication service 1080 stores or has access to information that link identifiers for RFID ICs, items, IC-item combinations, devices, services, and/or remote storages to their respective secrets or cryptographic keys. For example, authentication service 1080 may have access to record 1082, which links an ID 1084 to secret 1006 associated with IC 1002. ID 1084 may include or be based on ID 1004, IC ID 1066, and/or item ID 1072. Authentication service 1080 may also be configured to determine whether an entity is authorized to access item information. In these embodiments, authentication service 1080 stores or has access to information that identify whether certain entities are authorized to access certain information. For example, authentication service 1080 may have access to record 1086, which indicates that device 1022 is authorized to access digital identity information associated with ID 1084.

When authentication service 1080 receives a request from a first entity to determine whether a second entity is authentic and/or authorized, authentication service 1080 may first determine whether the first entity is authentic and authorized. Authentication service 1080 may authenticate the first entity using a challenge-response interaction or any other suitable authentication technique. For example, authentication service 1080 may determine whether a reply from the first entity responding to a challenge is at least partially cryptographically computed based on a secret associated with the first entity. If so, authentication service 1080 determines that the first entity is authentic.

In some embodiments, authentication service 1080 may authenticate an entity using other, non-cryptographic information instead of or in addition to cryptographic information. For example, authentication service 1080 may have access to other information, such as digital identity information, about authenticated entities. If the information about authenticated entities indicates that the entity is unlikely to be authentic, authentication service 1080 may refuse to authenticate the entity. For example, suppose that authentication service 1080 has access to historical location information about an authenticated entity indicating that the entity is currently within a certain area. If authentication service 1080 receives a request from the purported entity but associated with a location significantly outside the certain area, the authentication service 1080 may determine that the purported entity is unlikely to be authentic. In addition to location information, any other information can be used, such as history of behavior, history of requests, information previously requested, etc.

Authentication service 1080 may then determine, based on its access to authorization information, whether the authenticated first entity is authorized. Upon determining that the first entity is authentic or authorized, or if no authentication or authorization is needed, authentication service 1080 may then determine whether the second entity is authentic and authorized. The request from the first entity may include authentication-related information associated with the second entity (for example, a cryptographic response received from the second entity), as well as an identifier for the second entity. Authentication service 1080 may attempt to authenticate the second entity using the identifier and the authentication-related information associated with the second entity, via any suitable authentication technique. Authentication service 1080 may also determine whether the second entity, if authentic, is authorized to access the requested information. If the second entity is determined to be authentic and authorized, authentication service 1080 may notify the first entity accordingly.

In some embodiments, authorization to access digital identity information about item 1010 and IC 1002 requires proof-of-possession. In these embodiments, an entity requesting access to digital identity information about item 1010 may need to prove that the entity possesses item 1010 at the time of the request.

Proof-of-possession may require physical proximity. For example, authentication service 1080 or a trusted reader may determine that an entity interacting with the reader is in possession of a tagged item if the item is in close physical proximity to the reader. The authentication service 1080 or the reader may determine proximity based on one or more characteristic(s) of a response received from the tagged item. Such characteristics may include a received signal strength indicator (RSSI), a response power, a response rate, a determined item location, or any other indication of proximity.

Proof-of-possession may be tested using a time-sensitive challenge-response mechanism. In a time-sensitive challenge-response mechanism, authentication service 1080 sends a challenge to the requesting entity at a first time. The authentication service 1080 then expects a response from the requesting entity containing a reply to the challenge within a certain time threshold from the first time. If the authentication service 1080 receives a response that satisfies the time threshold (e.g., is received before the time threshold expires) and determines that the response includes a reply correctly derived from both the challenge and secret 1006, then authentication service 1080 deems that the requesting entity possesses item 1010. On the other hand, if the authentication service 1080 receives a response satisfying the time threshold but with an incorrectly-derived reply or a response that does not satisfy the time threshold, then the authentication service 1080 may determine that the requesting entity does not possess item 1010 and that the request for information is therefore inappropriate.

Testing proof-of-possession does not have to be time-sensitive. For example, if authentication service 1080 receives a request to access digital identity information from a trusted reader or entity, the authentication service 1080 may accept a challenge generated by the trusted reader or entity instead of itself generating and sending a challenge. The authentication service 1080 may determine that a reader or entity is trusted based on the authentication and authorization procedures described above.

In other embodiments, authorization to access digital identity information about item 1010 and IC 1002 requires authorization from an owner of item 1010 and/or IC 1002. In these embodiments, authentication service 1080 may either determine if preexisting owner authorization for information access exists, or contact the owner or an owner proxy (an entity authorized to act on behalf of the owner) for authorization. When contacting the owner or owner proxy, authentication service 1080 may send the request for information access, the item identifier, an identifier for the requesting entity, other information requested by the owner/proxy, or any other suitable information. In some embodiments, authentication service 1080 may alert the item owner, the item possessor, or a third party whenever a request to access information about the item is received.

If one or more entities associated with a request are determined to be not authentic or not authorized, or the request itself is determined to be inappropriate, authentication service 1080 may send an error notification to the requester, grant the one or more entities access to a default subset of digital identity information, or ignore and not respond to the request. In some embodiments, authentication service 1080 may send a notification regarding the failed request to another entity or a third party. For example, authentication service 1080 may send a message to an owner or possessor of the item whose digital identity information is being requested, an owner of the requested digital identity information, a security agency, some authority, or some other relevant entity. In some embodiments, the message may be sent to a message buffer associated with the item, such as messages information 850, and then pushed to or pulled by the appropriate entity.

If the request is determined to be inappropriate, in some embodiments, authentication service 1080 may allow the requester to attempt authentication again. For example, authentication service 1080 may allow the requester to make another request. Authentication service 1080 may also attempt to determine whether the requester is authorized to access the requested item information (for example, can the requester be authenticated as an item owner?) If so, authentication service 1080 may provide at least some of the requested item information, even if the request was determined to be inappropriate.

In some embodiments, if the authentication service 1080 receives a response satisfying the time threshold but with no reply to the challenge, the authentication service 1080 may determine that the requesting entity does not possess item 1010, but that the request for information is not necessarily inappropriate. In this case, some default subset of digital identity information may be provided to the requesting entity. If the requesting entity can prove ownership of the item, additional digital identity information may be provided, even if the requesting entity is not currently in possession of the item.

In some embodiments, determination of authentication and authorization may revolve around individual requests for digital identity information instead of (or in addition to) requesting entities. For example, suppose that information service 1030 receives a request for digital identity information about item 1010 from device 1022. Instead of determining whether device 1022 is authentic and authorized to access the digital identity information, information service 1030 (or another service or remote storage) may determine whether the request itself is authentic and has authorization to access the digital identity information. The request may have identity information associated with the requesting entity, in which case determining the request's authentication and authorization is analogous to determining the requesting entity's authentication and authorization. However, in some situations the request may not have identity information associated with a requesting entity, and only have identity information associated with the request itself, such as a timestamp, a location identifier, or similar. In these situations, the authenticity and authorization of the request may be based on the request's identity information.

Authenticity and authorization may also be based on the location of item 1010 and/or device 1022. For example, an item or requesting device at a first location may be authorized to access a certain set of information or services, whereas if the item or requesting device is at a second location access to a different set of information or services may be authorized.

Once a request for or entity requesting (e.g., device 1022) digital identity information about item 1010 and IC 1002 has been determined to be authentic and authorized, and proof-of-possession determined if necessary, information service 1030, remote storages 1040 and 1045, other service(s) 1050, and registration service 1060 may allow access to the requested information or services. For example, registration service 1060 may allow access to records 1062 and 1068, remote storages 1040 and 1045 may allow access to records 1042, 1044, and 1046, and other service(s) 1050 may allow access to records 1052 and/or associated services. The requested information may then be sent to information service 1030, which then sends the information to resolver service 1025 and then to device 1022.

In some embodiments, different digital identity information may have different access restrictions. For example, certain digital identity records or services may be publicly accessible, other records or services may only be accessible to entities or requests having at least a certain authorization level, while yet other records or services may only be accessible to entities or requests having yet another authorization level.

In some embodiments, authentication service 1080 provides a first subset of authentication and/or authorization services to any requester, a second subset of services to a requester having possession of an item, a third subset of services to a requester having ownership of the item, and a fourth subset of services to a requester having ownership and possession of the item. Similarly, registration services 1060 may provide different subsets of linked identifier information to a requester, depending on whether the requester owns and/or possesses the associated item. Likewise, remote storages 1040 and 1045 may provide different subsets of records to a requester, depending on whether the requester owns and/or possesses the associated item. The different subsets and the different authorization or permission levels may be controlled by the owners of the information and/or the item. So, while the different authorization levels above are tied to item ownership and/or possession, authorization levels may also be based on criteria such as time-of-request, location-of-request, requester identity, or any other suitable criteria. The different subsets of information and services may overlap, be entirely separate, be wholly contained in each other (e.g., a first subset may be entirely contained in a second subset), or even be identical. In some embodiments, a subset of information or services may be the null set (in other words, include no information or services).

In some embodiments, multiple resolver, information, registration, and/or authentication services may exist, and an entity that wishes to communicate with a certain type of service may identify the appropriate service in any suitable way. For example, device 1022 may determine a specific resolver service to communicate with based on information received from RFID IC 1002 or other information about resolver services stored locally at or otherwise accessible by device 1022. A resolver service may then determine appropriate information services to communicate with, and an information service may determine specific registration services or authentication services to communicate with, based on information received from device 1022 or RFID IC 1002 or other information about various services stored locally at or otherwise accessible by the various entities.

While in this disclosure different functionalities (e.g., resolution, registration, authorization, etc.) are segregated among different services, in other embodiments functionalities may be combined or distributed in any suitable way. For example, a single service may provide two or more of resolution, information, registration, and authorization. In some embodiments, a single functionality may be distributed among multiple services. For example, two or more different resolver services may provide identical, overlapping, and/or entirely nonoverlapping resolution services.

The techniques and embodiments described herein are applicable to any use case in which a physical item has a digital identity. One use case example involves a traveler purchasing a suitcase for use in an upcoming trip. The traveler orders the suitcase from a retailer web page. The suitcase has an identifier, which may be stored upon or known to a hardware component such as an RFID IC attached to or integrated in the suitcase. The identifier in turn links to the suitcase's digital identity, as described above. Upon completion of the purchase, the retailer, who was the suitcase's owner and therefore has access privileges to the suitcase's digital identity, update the suitcase's digital identity to reflect that the traveler is now or will be the suitcase's owner. For example, the retailer may update the suitcase's ownership information and/or history information, as described above. The change in ownership grants the traveler access to some or all of the suitcase's digital identity information. In some embodiments, the retailer and/or the suitcase manufacturer may retain some access to the suitcase's digital identity information.

The retailer then uses a shipping service to send the suitcase to the traveler. Once purchased, the suitcase's digital identity is linked to or includes the home address of the traveler, and the retailer and/or traveler may grant access to the address information to the shipping service. The shipping service can then use the suitcase's digital identity to facilitate the delivery of the suitcase to the traveler. For example, the shipping service may track and route the suitcase using the suitcase's identifier. In some embodiments, the shipping service may update the suitcase's history information based on the delivery process. The traveler, who has access to the suitcase's digital identity information, can in turn track the delivery of the suitcase.

Upon delivery, the traveler's home automation system may detect the new suitcase (for example, via an RFID reader that reads an RFID IC in the suitcase). The home automation system may then perform one or more tasks associated with the suitcase, either automatically or upon confirmation from the traveler. For example, the home automation system may register the suitcase's warranty (using properties information associated with the suitcase), alert other smart devices belonging to the traveler of the suitcase, adjust authorization/privacy information in the suitcase's digital identity information, and/or associate the suitcase's digital identity with the traveler's service accounts (e.g., frequent-flier programs and similar).

Before the trip, the suitcase's digital identity may be linked to the flight reservation, ticket, or boarding pass, either by the traveler or automatically by the traveler's automation system. The airline may be automatically alerted of the traveler's suitcase and whether it will be checked-in or carried-on by the traveler. If the former, airline or airport personnel may use the suitcase's digital identity to track and route the suitcase to ensure that it is loaded on the correct airplane. If the suitcase contains items with digital identities, the traveler may grant the airline or airport security access to the digital identity information. For example, if the suitcase contains fragile or perishable items with digital identities, the airline may use its knowledge of the item digital identity information to appropriately handle the suitcase at the airport.

Upon arrival at the destination, the traveler may be notified (for example, via a smartphone that can receive alerts and/or independently detect the suitcase) when the suitcase is unloaded, where it is in the airport, whether it has reached the baggage carousel, and/or whether the suitcase is approaching the traveler on the carousel. If instead there is a problem with the suitcase (for example, delivery of the suitcase is delayed for some reason), the airline or airport may notify the traveler, and the traveler may arrange for the suitcase's delivery to a particular destination. The traveler may then be able to track the suitcase's delivery progress, and upon delivery the traveler can verify the suitcase (e.g., via a smartphone), and the suitcase can also verify the traveler (e.g., also via the smartphone).

Later, the traveler may decide to replace the suitcase with another, smaller bag. The purchase process for the new bag may be similar to the purchase process for the original suitcase. The traveler may then decide to give the original suitcase to a friend, and may transfer ownership of the original suitcase to the friend, similar to how the retailer transfers ownership of the purchased suitcase.

Another use case example involves a refrigerator that is network-enabled and configured to read the RFID ICs. The refrigerator may be able to identify items within the refrigerator and order additional items and/or notify users if certain items are running low, used up, or approaching expiration. In some embodiments, the refrigerator is authorized to access digital identity information about items within the refrigerator, and can take action based on the digital identity information. For example, suppose that a recall notice has been issued for an RFID-enabled carton of eggs within the refrigerator. The egg producer, distributor, and/or a governmental agency may issue recall notices to all affected items, which may then reside in the messages information (e.g., the messages information 850) of the affected items' digital identities. The refrigerator, which may be configured to check the digital identity information of items within the refrigerator periodically and/or dynamically, may receive the recall notice message for the carton of eggs, and may notify users accordingly.

As mentioned previously, embodiments are directed to digital identities for physical items. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary or thought of in terms of various interconnected distinct software modules.

The operations described in processes 1400, 1500, 1600, and 1650 are for illustrative purposes only. These operations may be implemented using additional or fewer operations and in different orders using the principles described herein.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A server, part of a network configured to determine whether a reader communicatively coupled to the server has access to an item and to control, based on the determined access, item information the network provides, wherein the item includes an RFID IC containing an item identifier and a shared secret known to the IC and the network but not to the reader, the server comprising:
   a memory configured to store instructions; and
   a processor coupled to the memory, wherein the processor, in conjunction with the instructions stored in the memory, is configured to:
      receive, from the reader, a request for the item information, wherein the request includes the item identifier;
      in response to receiving the item information request, request proof-of-possession of the IC by sending a challenge intended for the IC to the reader;
      receive a response from the reader;
      if the response does not include a reply to the challenge, then conclude that proof-of-possession of the IC was not received but the request is appropriate and therefore provide a first subset of the item information;
      if the response includes a reply to the challenge, then determine, based on the shared secret, whether the reply is correct; and
      if the reply is correct, then conclude that the reply was computed by the IC and therefore proves possession of the IC and provide a second subset of the item information; else conclude that possession of the IC was not proved and the request is inappropriate.

2. The server of claim 1, wherein the first subset is at least one of:
   a subset of the second subset; and
   different from the second subset.

3. The server of claim 1, wherein at least one of the first subset and the second subset includes at least one of:
   item ownership information;
   item history information;
   item properties information;
   item authentication information;
   item miscellaneous information;
   item authorization information; and
   item privacy information.

4. The server of claim 1, wherein, to determine whether the reply is correct, the processor is configured to at least one of:
   determine whether the reply is at least partially cryptographically computed based on the shared secret; and
   determine whether a time elapsed between sending the challenge and receiving the response satisfies a threshold.

5. The server of claim 1, wherein, upon concluding that the request is inappropriate, the processor is configured to at least one of:
   provide an error notification;
   provide one of a third subset of the item information and no item information;
   send a notification to a third party; and
   attempt to determine whether the reader is authorized to receive the item information.

6. The server of claim 1, wherein the processor is further configured to:
   determine whether the reader is authorized to receive the item information; and
   provide more item information to the reader if the reader is authorized than if the reader is not authorized.

7. The server of claim 1, wherein the processor is further configured to:
   determine whether the reader is associated with an owner of the item; and
   provide more item information to the reader if the reader is associated with the owner than if the reader is not associated with the owner.

8. A server, part of a network configured to determine whether a reader communicatively coupled to the server has access to an item and to control, based on the determined access, item information the network provides, wherein the item includes an RFID IC containing an item identifier and a shared secret known to the IC and the network but not to the reader, the server comprising:
   a memory configured to store instructions; and a processor coupled to the memory, wherein the processor, in conjunction with the instructions stored in the memory, is configured to:
    receive, from the reader, a request for the item information, wherein the request includes the item identifier;
    in response to receiving the item information request, request proof-of-possession of the IC by sending a challenge intended for the IC to the reader;
    receive a response from the reader;
    if the response does not include a reply to the challenge, then conclude that proof-of-possession of the IC was not received but the request is appropriate and therefore provide a first subset of the item information;
    if the response includes a reply to the challenge, then determine, based on the shared secret, whether the reply is correct;
    if the reply is correct, then conclude that the reply was computed by the IC and therefore proves possession of the IC and provide a second subset of the item information; else conclude that possession of the IC was not proved and the request is inappropriate; and
    alert an owner of the item to the request.

9. The server of claim 8, wherein the first subset is at least one of:
    a subset of the second subset; and
    different from the second subset.

10. The server of claim 8, wherein at least one of the first subset and the second subset includes at least one of:
    item ownership information;
    item history information;
    item properties information;
    item authentication information;
    item miscellaneous information;
    item authorization information; and
    item privacy information.

11. The server of claim 8, wherein, to determine whether the reply is correct, the processor is configured to at least one of:
    determine whether the reply is at least partially cryptographically computed based on the shared secret; and
    determine whether a time elapsed between sending the challenge and receiving the response satisfies a threshold.

12. The server of claim 8, wherein, upon concluding that the request is inappropriate, the processor is configured to at least one of:
    provide an error notification;
    provide one of a third subset of the item information and no item information;
    send a notification to a third party; and
    attempt to determine whether the reader is authorized to receive the item information.

13. The server of claim 8, wherein the processor is further configured to:
    determine whether the reader is authorized to receive the item information; and
    provide more item information to the reader if the reader is authorized than if the reader is not authorized.

14. A server, part of a network configured to determine whether a reader communicatively coupled to the server has access to an item, the item having an owner, and to control, based on the determined access, item information the network provides, wherein the item includes an RFID IC containing an item identifier and a shared secret known to the IC and the network but not to the reader, the server comprising:

a memory configured to store instructions; and
a processor coupled to the memory, wherein the processor, in conjunction with the instructions stored in the memory, is configured to:
    receive, from the reader, a request for the item information, wherein the request includes the item identifier;
    receive authorization from the owner to provide the item information;
    in response to receiving the authorization from the owner, request proof-of-possession of the IC by sending a challenge intended for the IC to the reader;
    receive a response from the reader;
    if the response does not include a reply to the challenge, then conclude that proof-of-possession of the IC was not received but the request is appropriate and therefore provide a first subset of the item information;
    if the response includes a reply to the challenge, then determine, based on the shared secret, whether the reply is correct; and
    if the reply is correct, then conclude that the reply was computed by the IC and therefore proves possession of the IC and provide a second subset of the item information; else conclude that possession of the IC was not proved and the request is inappropriate.

15. The server of claim 14, wherein the first subset is at least one of:
    a subset of the second subset; and
    different from the second subset.

16. The server of claim 14, wherein at least one of the first subset and the second subset includes at least one of:
    item ownership information;
    item history information;
    item properties information;
    item authentication information;
    item miscellaneous information;
    item authorization information; and
    item privacy information.

17. The server of claim 14, wherein, to determine whether the reply is correct, the processor is configured to at least one of:
    determine whether the reply is at least partially cryptographically computed based on the shared secret; and
    determine whether a time elapsed between sending the challenge and receiving the response satisfies a threshold.

18. The server of claim 14, wherein, upon concluding that the request is inappropriate, the processor is configured to at least one of:
    provide an error notification;
    provide one of a third subset of the item information and no item information;
    send a notification to at least one of the owner and a third party; and
    attempt to determine whether the reader is authorized to receive the item information.

19. The server of claim 14, wherein, to receive authorization from the owner to provide the item information, the processor is configured to identify, based on a preference of the owner, the first and second subsets of item information.

20. The server of claim 14, wherein, to receive authorization from the owner to provide the item information, the processor is configured to provide at least one of the request and a reader identifier to the owner.

* * * * *

UNITED STATES PATENT AND TRADEMARK OFFICE
CERTIFICATE OF CORRECTION

PATENT NO. : 11,232,340 B1
APPLICATION NO. : 16/912822
DATED : January 25, 2022
INVENTOR(S) : Christopher J. Diorio et al.

It is certified that error appears in the above-identified patent and that said Letters Patent is hereby corrected as shown below:

On the Title Page

Item (74) In Column 2, Line 1, Delete "Turk" and insert -- Turk, --.

Pg. 2 Item (56) In Column 1, Line 6, Delete "Faik et al." and insert -- Falk et al. --.

In the Specification

In Column 14, Line 63, Delete "facility)" and insert -- facility). --.

Signed and Sealed this
Twenty-seventh Day of September, 2022

Katherine Kelly Vidal
*Director of the United States Patent and Trademark Office*